United States Patent
Kim et al.

(10) Patent No.: US 11,794,527 B2
(45) Date of Patent: Oct. 24, 2023

(54) TIRES WITH RESONATORS FOR NOISE REDUCTION

(71) Applicant: HANKOOK TIRE & TECHNOLOGY CO., LTD, Seongnam-si (KR)

(72) Inventors: Il Sik Kim, Daejeon (KR); Jeong Eun Cho, Daejeon (KR); Su Jin Son, Seoul (KR); Kang Il Jung, Daejeon (KR); Chang Hyo Hong, Daejeon (KR); Jae Wook Ihm, Sejong-si (KR)

(73) Assignee: HANKOOK TIRE & TECHNOLOGY CO., LTD.

( * ) Notice: Subject to any disclaimer, the term of this patent is extended or adjusted under 35 U.S.C. 154(b) by 106 days.

(21) Appl. No.: 17/094,367

(22) Filed: Nov. 10, 2020

(65) Prior Publication Data

US 2021/0138841 A1    May 13, 2021

(30) Foreign Application Priority Data

Nov. 12, 2019   (KR) .................. 10-2019-0143894

(51) Int. Cl.
*B60C 11/12*       (2006.01)
*B60C 11/03*       (2006.01)

(52) U.S. Cl.
CPC ........ *B60C 11/0318* (2013.01); *B60C 11/032* (2013.01); *B60C 11/1218* (2013.01); *B60C 11/1236* (2013.01); *B60C 11/1281* (2013.01); *B60C 2011/0381* (2013.01)

(58) Field of Classification Search
CPC ............. B60C 11/1218; B60C 11/1236; B60C 11/1281; B60C 11/032
See application file for complete search history.

(56) References Cited

U.S. PATENT DOCUMENTS

| | | | |
|---|---|---|---|
| 8,770,240 B2 | 7/2014 | Bervas et al. | |
| 2012/0118460 A1* | 5/2012 | Kiwaki | B60C 11/1376 152/209.18 |
| 2022/0024261 A1* | 1/2022 | Kawashima | B60C 11/04 |

FOREIGN PATENT DOCUMENTS

| | | | |
|---|---|---|---|
| JP | 01-101205 A | * | 9/1989 |
| JP | 2001-063323 A | * | 3/2001 |
| JP | 2006-341816 A | * | 12/2006 |
| JP | 2007-269144 A | * | 10/2007 |
| JP | 2008-308131 A | | 12/2008 |
| JP | 2010-260403 A | * | 11/2010 |
| KR | 10-1957640 B1 | | 3/2019 |

OTHER PUBLICATIONS

Machine translation for Japan 2010-260403 (Year: 2022).*
Machine translation for Japan 2007-269144 (Year: 2022).*
Machine translation for Japan 2006-341816 (Year: 2022).*
Machine translation for Japan 2001-063323 (Year: 2022).*
Machine translation for Japan 01-101205 (Year: 2022).*

* cited by examiner

*Primary Examiner* — Steven D Maki
(74) *Attorney, Agent, or Firm* — Bridgeway IP Law Group, PLLC; Jihun Kim

(57) ABSTRACT

A tire with a resonator for noise reduction includes: a main groove unit which has a plurality of main grooves formed to extend along a circumferential direction of the tire; a resonance unit which is formed between a pair of the main grooves; a neck unit which is provided to communicate the resonance unit with one of the pair of main grooves; and a cuff unit which is provided to connect the resonance unit and the other of the pair of main grooves.

9 Claims, 10 Drawing Sheets

TIRES WITH RESONATORS FOR NOISE REDUCTION

BACKGROUND

Field

The present invention relates to a tire with a resonator for noise reduction and more particularly to a tire with a resonator which reduces noise by reducing noise energy generated in main grooves.

Description of the Related Art

A vehicle which goes forward by rolling wheels is inherently has no choice but to make noise. However, noise such as engine sound coming from inside and outside the vehicle, wind noise (sound of wind), etc., while driving, always annoys the driver and passengers. For this reason, it is common to block the noise by using a soundproofing material, a sound-absorbing material, etc.

However, the Ministry of Environment has recently announced that it will introduce "tire noise insulation performance indication system" which is being carried out in European Union (EU) from 2019. In response to this, technology developments to reduce noise are being made ahead of enforcement of the system. Particularly, while, in the past, the focus was on reducing the generation of noise inside the vehicle such as the engine, there are increasing cases of applying a new low noise technology from the early stage of tire product development in order to minimize the noise generated outside the vehicle such as from a tire.

In particular, tires for electric vehicles, whose market share is rapidly increasing in recent years, are required to have noise characteristics different from those of an Internal Combustion Engine (ICE) vehicle.

For example, in the case of an ICE vehicle, the noise from the engine causes the largest noise over the entire range of indoor noise. However, since the electric vehicle does not have an engine, it has an overall low noise level and the largest noise generated from the tire. Therefore, recently, a low noise tire becomes gradually more important.

A peak due to pipe resonance occurs in a range of 1 kHz in tire noise, and the resulting effect occupies a very large proportion of the overall noise. Specifically, when the main groove in the traveling direction of the tire contacts the ground, the ground and the main groove form a pipe shape. Here, pipe resonance noise in a 1 kHz band is generated due to pipe-shaped flow inside the main groove.

Therefore, there is a necessity of a technology for reducing the pipe resonance noise generated in the main groove of the tire.

PRIOR ART DOCUMENT (Patent Document 1) Korean Patent No. 10-1957640

SUMMARY

Technical Problem

The purpose of the present invention to solve the aforementioned problems is to provide a tire with a resonator which reduces noise by reducing noise energy generated in main grooves.

The technical problem to be overcome in this document is not limited to the above-mentioned technical problems. Other technical problems not mentioned can be clearly understood from those described below by a person having ordinary skill in the art.

Technical Solution

One embodiment is a tire with a resonator for noise reduction. The tire includes: a main groove unit which has a plurality of main grooves formed to extend along a circumferential direction of the tire; a resonance unit which is formed between a pair of the main grooves; a neck unit which is provided to communicate the resonance unit with one of the pair of main grooves; and a cuff unit which is provided to connect the resonance unit and the other of the pair of main grooves.

According to the embodiment of the present invention, the resonance unit is composed of a Helmholtz resonator.

According to the embodiment of the present invention, the main groove unit includes a first main groove, a second main groove, a third main groove, and a fourth main groove, which are formed separately from each other and sequentially from the outside of the vehicle.

According to the embodiment of the present invention, the resonance unit is formed between a pair of main grooves among the first main groove, the second main groove, the third main groove, and the fourth main groove.

According to the embodiment of the present invention, the resonance unit includes: a first resonance unit provided between the first main groove and the second main groove; and a second resonance unit provided between the third main groove and the fourth main groove.

According to the embodiment of the present invention, volumes of the first resonance unit and the second resonance unit are 500 mm$^3$ to 1,500 mm$^3$.

According to the embodiment of the present invention, the neck unit includes a first neck unit provided to connect the first resonance unit and the first main groove; and a second neck unit provided to connect the second resonance unit and the third main groove.

According to the embodiment of the present invention, the first neck unit includes: a straight flow path which is formed to extend between the first resonance unit and the first main groove; a curved flow path which is formed to extend toward a bottom of the straight flow path and to have a predetermined radius; and a cylindrical neck which is formed under the curved flow path.

According to the embodiment of the present invention, the straight flow path and the curved flow path are formed in an interlocking structure and are closed when receiving a load. The neck is formed to maintain the state where the first main groove and the first resonance unit are in communication with each other even when receiving a load. The neck is provided to reduce pipe resonance noise by communicating air within the first main groove and air within the first resonance unit.

According to the embodiment of the present invention, a length of the first neck unit is formed to be 5 mm to 20 mm.

According to the embodiment of the present invention, a diameter of the neck is determined by a distance between the first main groove and the second main groove and a volume of the first resonance unit.

According to the embodiment of the present invention, the diameter of the neck is 1 mm to 3 mm and a cross-sectional area of the neck is 1 mm$^2$ to 12 mm$^2$.

According to the embodiment of the present invention, the second neck unit includes: a straight flow path which is formed to extend between the second resonance unit and the third main groove; a curved flow path which is formed to extend toward a bottom of the straight flow path and to have a predetermined radius; and a cylindrical neck which is formed under the curved flow path.

According to the embodiment of the present invention, the straight flow path and the curved flow path are formed in an interlocking structure and are closed when receiving a load. The neck is formed to maintain the state where the third main groove and the second resonance unit are in communication with each other even when receiving a load. The neck is provided to reduce pipe resonance noise by communicating air within the third main groove and air within the second resonance unit.

According to the embodiment of the present invention, the cuff unit includes a first cuff unit which is provided to connect the first resonance unit and the second main groove; and a second cuff unit which is provided to connect the second resonance unit and the fourth main groove.

According to the embodiment of the present invention, the first cuff unit includes: a straight flow path which is formed to extend between the first resonance unit and the second main groove; and a curved flow path which is formed to extend toward a bottom of the straight flow path and to have a predetermined radius.

According to the embodiment of the present invention, the second cuff unit includes: a straight flow path which is formed to extend between the second resonance unit and the fourth main groove; and a curved flow path which is formed to extend toward a bottom of the straight flow path and to have a predetermined radius.

According to the embodiment of the present invention, the resonance unit further includes a third resonance unit which is provided between the second main groove and the third main groove.

According to the embodiment of the present invention, the first cuff unit and the second cuff unit are provided to include an image cuff of which a depth is smaller than those of the straight flow path and the curved flow path.

Advantageous Effects

According to the embodiment of the present invention, it is possible to reduce the pipe resonance noise generated in the main groove.

Specifically, the resonance unit capable of serving as a Helmholtz resonator is provided between the main grooves and is connected with the main groove through the neck unit. The pipe resonance noise generated in the main groove is transmitted to the resonance unit through the neck unit. The pipe resonance transmitted to the resonance unit generates resonance. As a result, the flow enters and exits rapidly through the neck unit which connects the main groove and the resonance unit. Here, noise energy is reduced by Viscothermal effects that is a noise attenuation mechanism.

Also, in the case of another company's pattern in which the neck unit of the resonance unit is on the surface of the tire, new noise may be caused when it contacts the ground. However, according to the embodiment of the present invention, the neck unit connecting the main groove and the resonance unit is inserted inside the surface of the tire, so that the noise which is generated when the neck unit is exposed on the surface of the tire is minimized.

Also, a 3D-cuff shape is applied when inserting the neck inside the surface, so that it is possible to reduce friction sound between blocks and air pumping noise during tire rotation.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
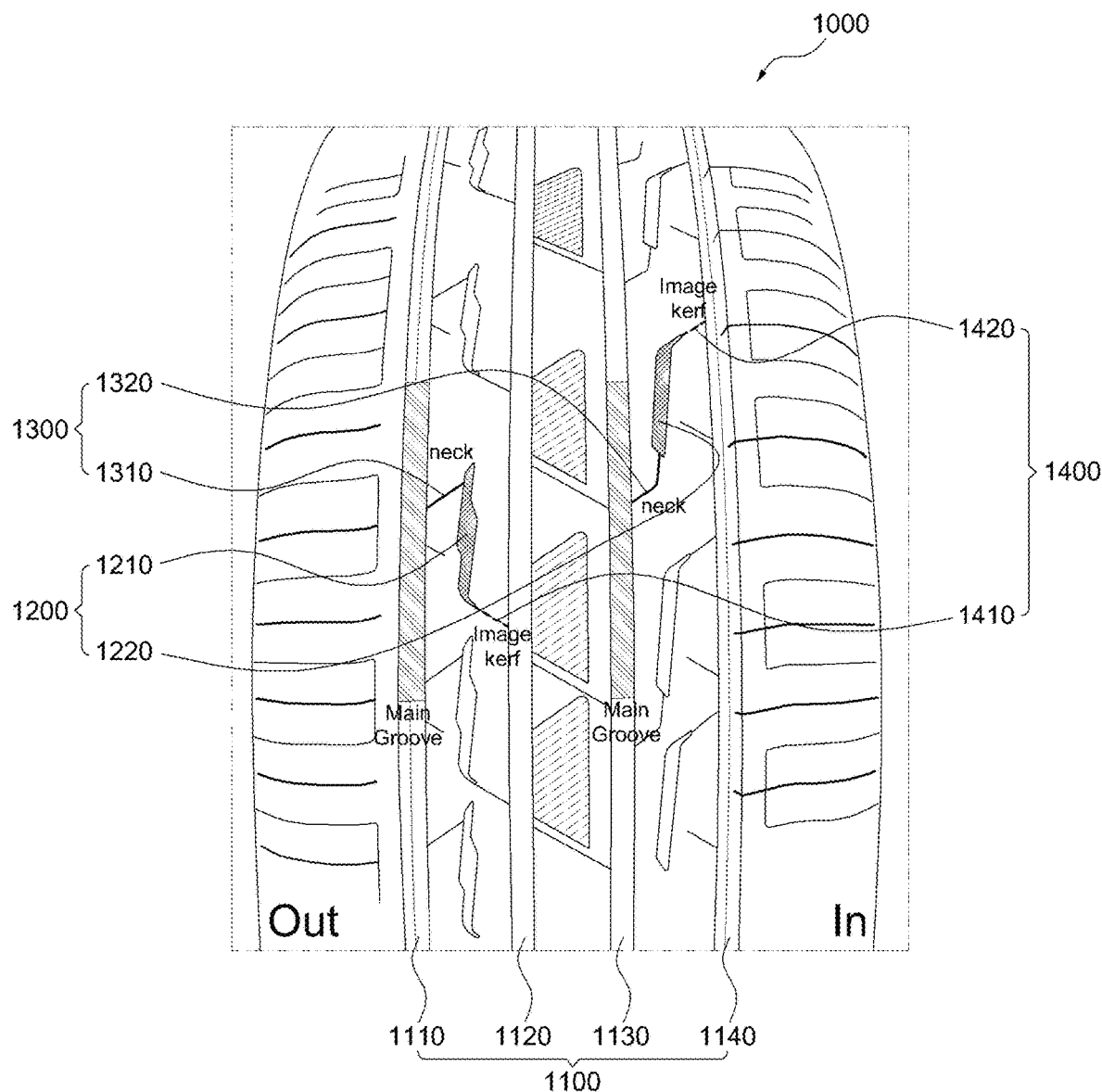
FIG. 1 is a view showing a tire with a resonator for noise reduction according to an embodiment of the present invention.

Hereinafter, the present disclosure will be described with reference to the accompanying drawings. However, the present disclosure may be embodied in various forms and is not limited to the embodiment described in the present specification. In the drawings, parts irrelevant to the description will be omitted for a clear description of the present disclosure. Similar reference numerals will be assigned to similar parts throughout this patent document.

Throughout the specification, when it is mentioned that a portion is "connected (accessed, contacted, combined)" to another portion, it includes not only "is directly connected" but also "indirectly connected" with another member placed therebetween. Additionally, when it is mentioned that a portion "includes" a component, it means that the portion does not exclude but further includes other components unless there is a special opposite mention.

Terms used in the present specification are provided for description of only specific embodiments of the present invention, and not intended to be limiting. An expression of a singular form includes the expression of plural form thereof unless otherwise explicitly mentioned in the context. In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Hereinafter, the embodiments of the present invention will be described in detail with reference to the accompanying drawings.

FIG. 1 is a view showing a tire with a resonator for noise reduction according to the embodiment of the present invention.

As shown in FIG. 1, a tire 1000 with a resonator for noise reduction includes a main groove unit 1100, a resonance unit 1200, a neck unit 1300, and a cuff unit 1400.

The main groove unit 1100 is composed of a plurality of main grooves formed to extend along a circumferential direction of the tire, and the main groove unit 1100 includes a first main groove 1110, a second main groove 1120, a third main groove 1130 and a fourth main groove 1140.

The first main groove 1110, the second main groove 1120, the third main groove 1130, and the fourth main groove 1140 may be sequentially formed from the outside of the vehicle.

That is, the first main groove 1110 may be a main groove located at the outermost side in a state where the tire is mounted on the vehicle.

Figure 2:
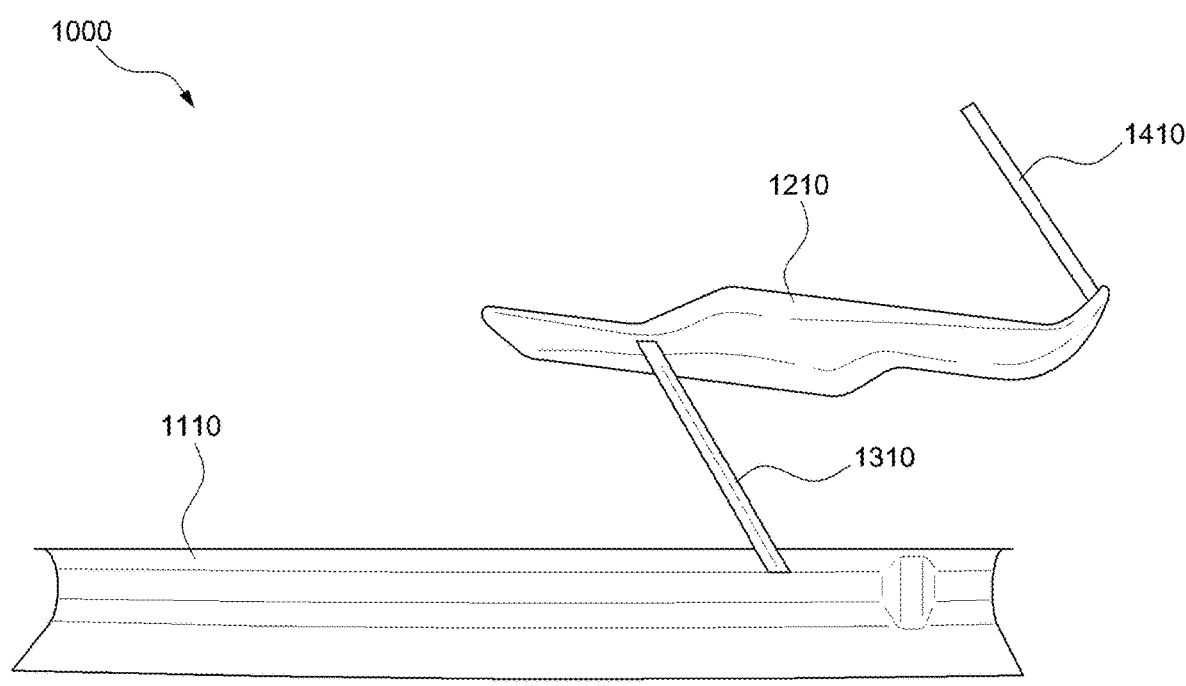
FIG. 2 is a view showing a first resonance unit, a first main groove, a first neck unit, and a first cuff unit according to the embodiment of the present invention.
Figure 3:
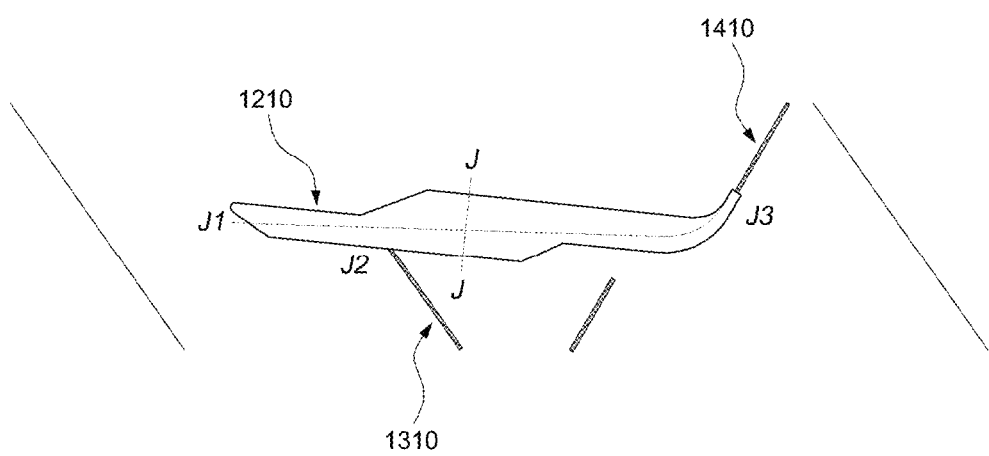
FIG. 3 is a design view showing the first resonance unit according to the embodiment of the present invention.
Figure 3:
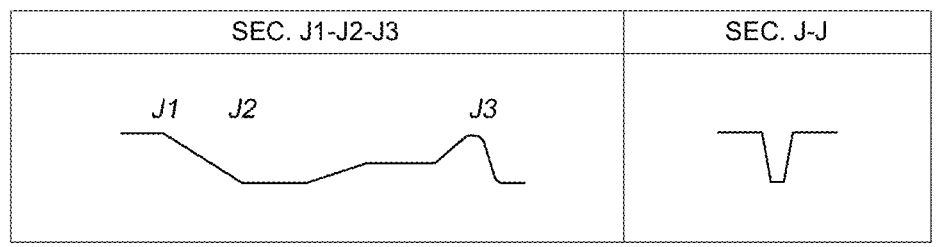
Figure 4:
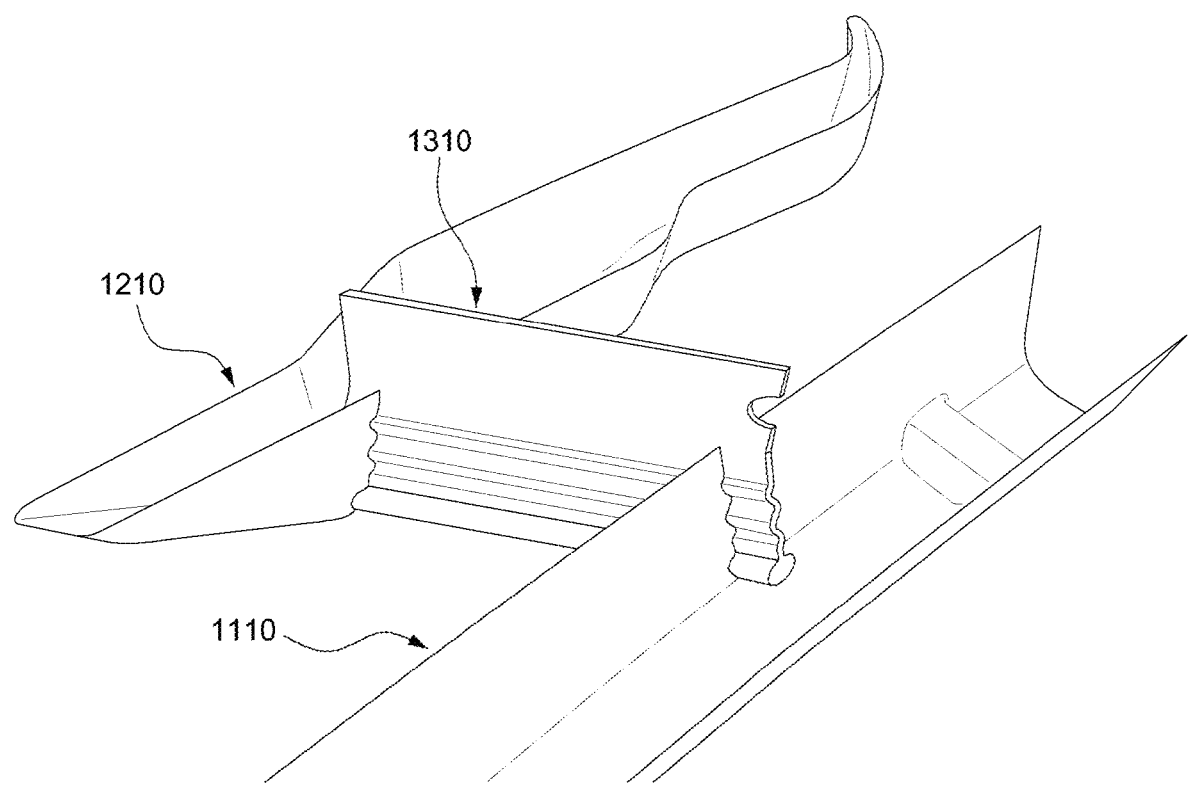
FIG. 4 is a perspective view showing the first resonance unit, the first main groove, and the first neck unit according to the embodiment of the present invention.

FIG. 2 is a view showing a first resonance unit, the first main groove, a first neck unit, and a first cuff unit according to the embodiment of the present invention. FIG. 3 is a design view showing the first resonance unit according to the embodiment of the present invention. FIG. 4 is a perspective view showing the first resonance unit, the first main groove, and the first neck unit according to the embodiment of the present invention.

With further reference to FIGS. 2 to 4, the resonance unit 1200 is formed on a mid-rib formed between a pair of the main grooves, and may be formed of a Helmholtz resonator.

The resonance unit 1200 is formed between a pair of the main grooves among the first main groove 1110, the second main groove 1120, the third main groove 1130, and the fourth main groove 1140.

Also, the resonance unit 1200 includes a first resonance unit 1210 and a second resonance unit 1220.

The first resonance unit 1210 may be provided between the first main groove 1110 and the second main groove 1120.

The second resonance unit 1220 may be provided between the third main groove 1130 and the fourth main groove 1140.

Also, the volumes of the first resonance unit 1210 and the second resonance unit 1220 may be 500 mm$^3$ to 1,500 mm$^3$.

Also, the resonance unit 1200 may be provided at every predetermined interval along the circumferential direction of the tire. For example, the resonance unit 1200 may be formed every two pitches in the circumferential direction of the tire.

The depth of the resonance unit 1200 may include the entire height of the neck unit 1300, the resonance unit 1200 may be located within an angle of 30 degrees to 90 degrees based on the main groove unit 1100.

The resonance unit 1200 may further include a third resonance unit provided between the second main groove 1120 and the third main groove 1130.

The neck unit 1300 may be provided to communicate the resonance unit 1200 with one of the pair of the main grooves, and may include a first neck unit 1310 and a second neck unit 1320.

Figure 5:
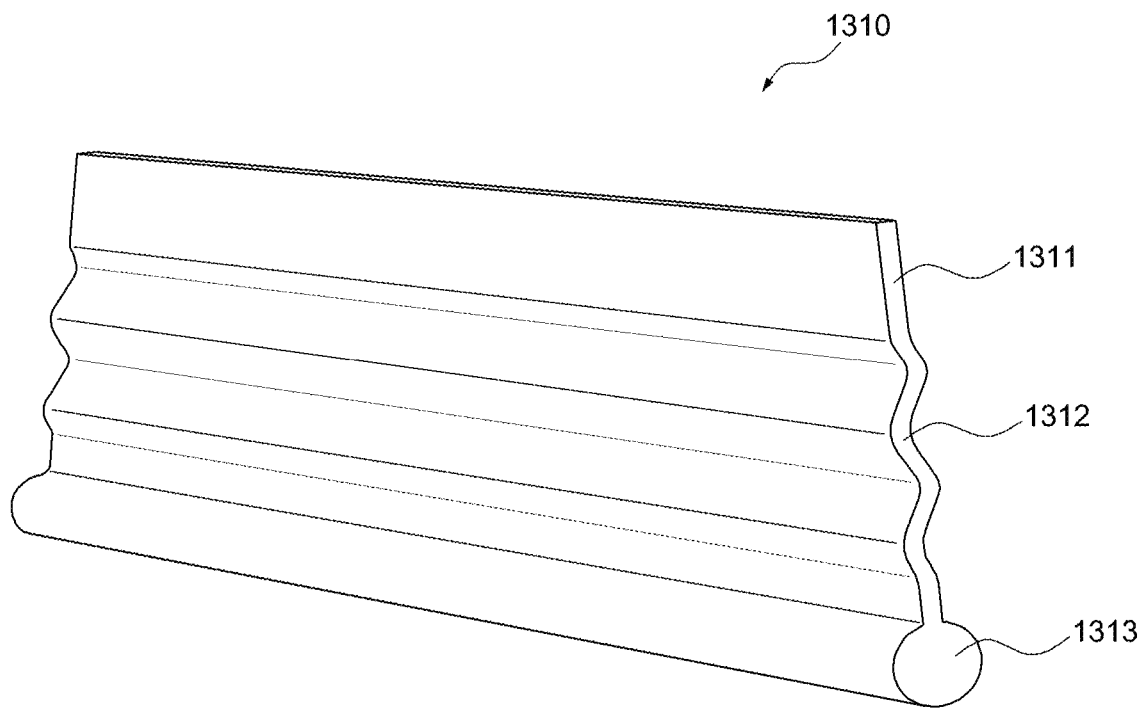
FIG. 5 is a perspective view showing the first neck unit according to the embodiment of the present invention.
Figure 6:
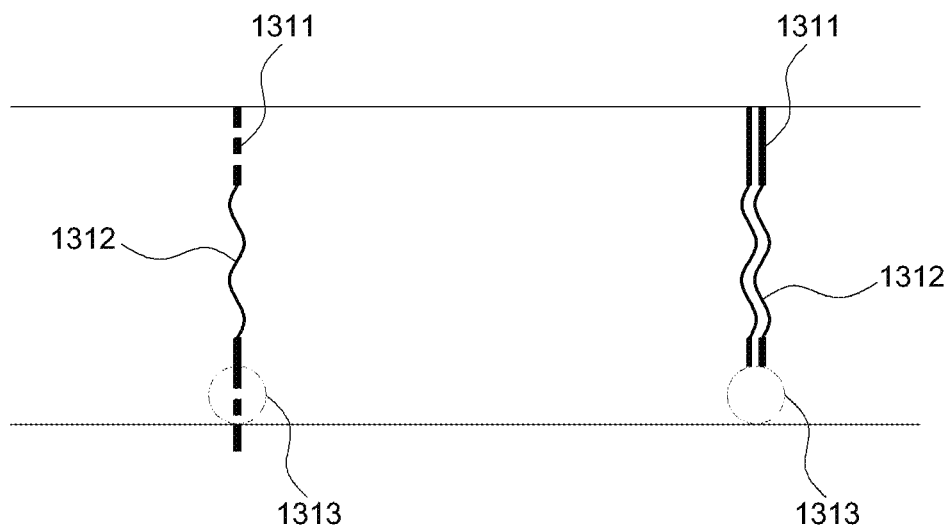
FIG. 6 is a design view showing the first neck unit according to the embodiment of the present invention.
Figure 7A:
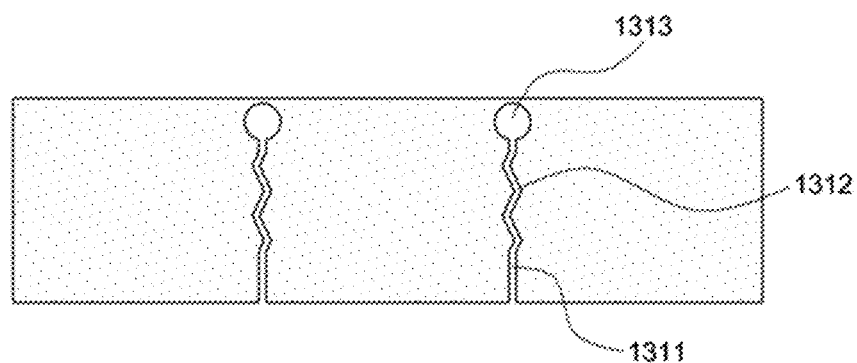
FIGS. 7A and 7B are views respectively showing before and after applying a load to the first neck unit in accordance with the embodiment of the present invention.
Figure 7B:
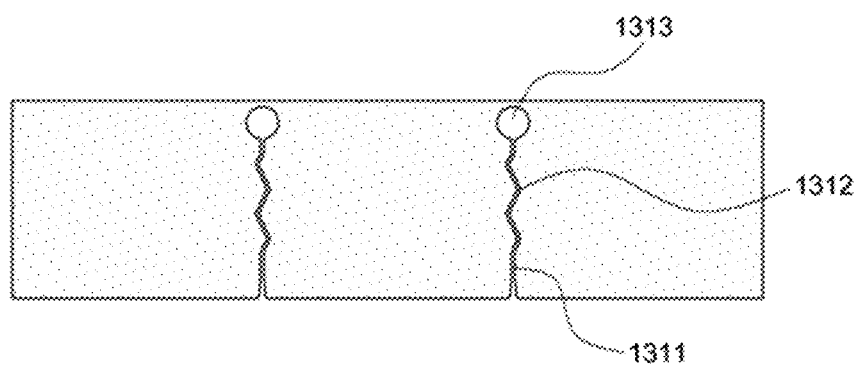

FIG. 5 is a perspective view showing the first neck unit according to the embodiment of the present invention. FIG. 6 is a design view showing the first neck unit according to the embodiment of the present invention. FIGS. 7A and 7B are views respectively showing before and after applying a load to the first neck unit in accordance with the embodiment of the present invention.

Figure 8:
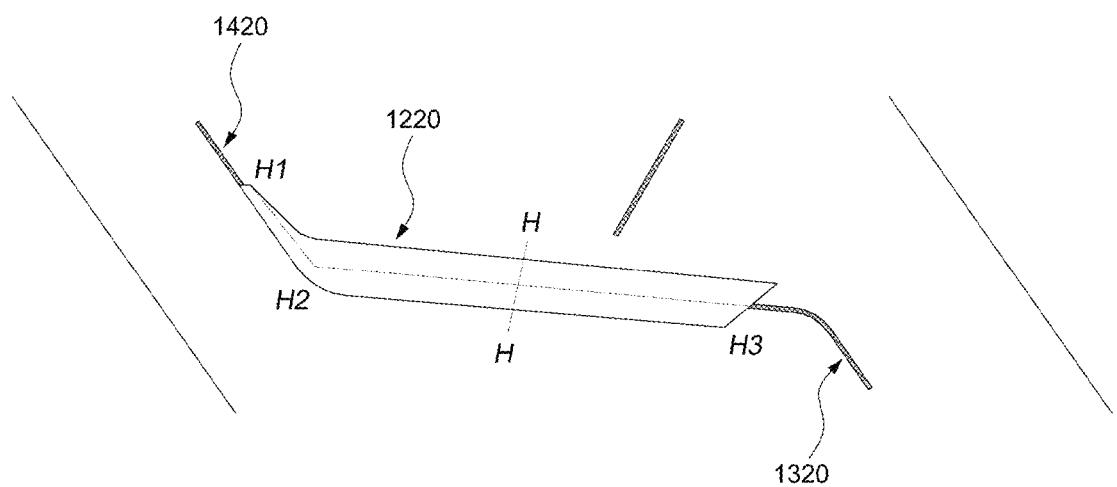
FIG. 8 is a design view showing a second resonance unit according to the embodiment of the present invention.
Figure 8:
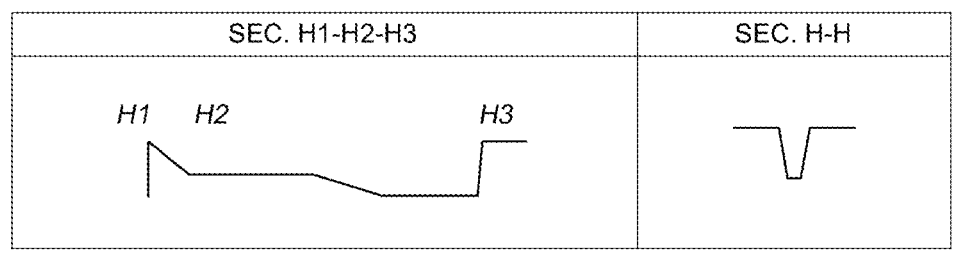
Figure 9:
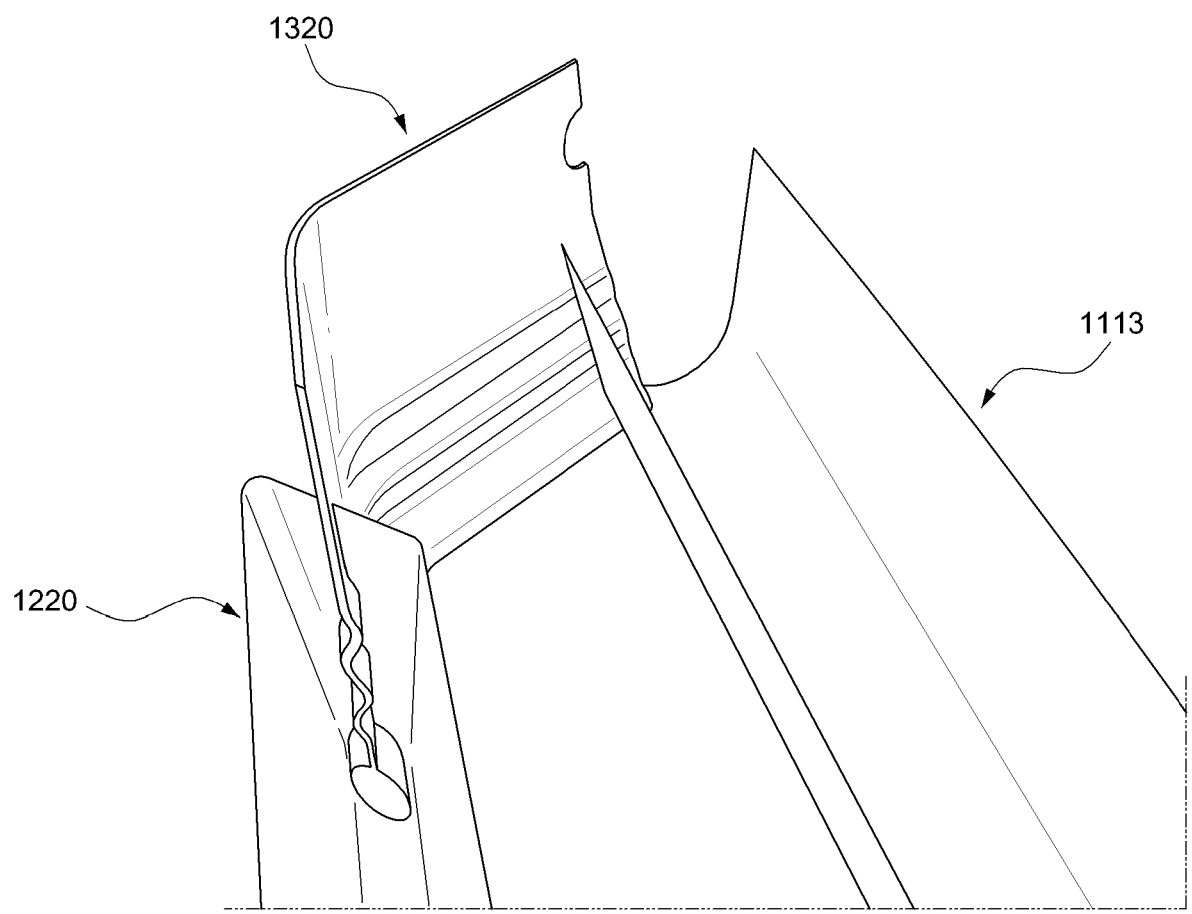
FIG. 9 is a perspective view showing the second resonance unit, a third main groove, and a second neck unit according to the embodiment of the present invention.

FIG. 8 is a design view showing the second resonance unit according to the embodiment of the present invention. FIG. 9 is a perspective view showing the second resonance unit, the third main groove, and the second neck unit according to the embodiment of the present invention.

Referring to FIGS. 5 to 9, the first neck part 1310 is provided to connect the first resonance unit 1210 and the first main groove 1110, and includes a straight flow path 1311, a curved flow path 1312, and a neck 1313.

The straight flow path 1311 may be formed to extend between the first resonance unit 1210 and the first main groove 1110. Also, the straight flow path 1311 may be provided to have a predetermined depth toward the bottom thereof may be formed to extend in a straight line shape in the depth direction.

The curved flow path 1312 may be formed to extend toward the bottom of the straight flow path 1311 and may be formed to extend to have a predetermined radius. For example, the curved flow path 1312 may extend toward the bottom of the straight flow path 1311 and may be formed in zigzags or in a wavy shape having a predetermined radius.

The neck 1313 may be formed under the curved flow path 1312 and may have a cylindrical shape. The neck 1313 may extend such that the first resonance unit 1210 and the first main groove 1110 communicate with each other.

The straight flow path 1311 and the curved flow path 1312 provided as described above may be formed in an interlocking structure and may be closed when they contact the ground and a load is applied. That is, when the straight flow path 1311 and the curved flow path 1312 contact the ground, they may be provided to perform a function of discharging internal water to the outside of the tire while being closed.

Meanwhile, the neck 1313 may be formed to maintain a state where the first main groove 1110 and the first resonance unit 1210 are in communication with each other even when receiving a load. The neck 1313 provided as described above may be provided to reduce pipe resonance noise by communicating air within the first main groove 1110 and air within the first resonance unit 1210.

Specifically, the first resonator 1210 capable of serving as a Helmholtz resonator is provided between the first main grooves 1110 and is connected to the first main groove 1110 through the neck 1313. The pipe resonance noise generated in the first main groove 1110 is transmitted to the first resonance unit 1210 through the neck 1313, and the pipe resonance transmitted to the first resonance unit 1210 generates resonance. That is, the flow is performed rapidly through the neck 1313 which connects the first main groove 1110 and the first resonance unit 1210. Here, noise energy is reduced by Visco-thermal effects that is a noise attenuation mechanism.

Also, when the first resonance unit 1210 and the neck 1313 are on the surface of the tire, new noise may be caused when they contact the ground. However, according to the embodiment of the present invention, the neck 1313 connecting the first main groove 1110 and the first resonance unit 1210 is inserted inside the surface of the tire, so that noise which is generated when the neck 1313 is exposed on the surface of the tire is minimized.

According to the embodiment of the present invention, a 3D-cuff shape is applied through the straight flow path 1311 and the curved flow path 1312 when inserting the neck 1313 into the inside of the surface of the tire, so that friction sound between blocks and air pumping noise during tire rotation.

The length of the first neck unit 1310 provided as described above may be formed to be 5 mm to 20 mm.

Also, the diameter of the neck 1313 may be determined by a distance between the first main groove 1110 and the second main groove 1120 and the volume of the first resonance unit 1210.

More specifically, the neck 1313 may have a diameter of 1 mm to 3 mm and may have a cross-sectional area of 1 mm$^2$ to 12 mm$^2$.

The second neck unit 1320 may be provided to connect the second resonance unit 1220 and the third main groove 1130.

The second neck unit 1320 includes a straight flow path, a curved flow path, and a neck. Since the configuration thereof is substantially the same as that of the first neck unit 1310, a detailed description thereof will be omitted.

The cuff unit 1400 may be provided to connect the resonance unit 1200 and the other of the pair of main grooves.

Specifically, the cuff unit 1400 includes a first cuff unit 1410 and a second cuff unit 1420.

The first cuff unit 1410 may be provided to connect the first resonance unit 1210 and the second main groove 1120, and the second cuff unit 1420 may be provided to connect the second resonance unit 1220 and the fourth main groove 1140.

The first cuff unit 1410 may be formed of a straight flow path and a curved flow path.

Specifically, the straight flow path of the first cuff unit 1410 may be formed to extend between the first resonance portion 1210 and the second main groove 1120. Also, the straight flow path may be provided to have a predetermined depth toward the bottom thereof may be formed to extend in a straight line shape in the depth direction.

The curved flow path may be formed to extend toward the bottom of the straight flow path and may be formed to extend to have a predetermined radius. For example, the curved flow path may extend toward the bottom of the straight flow path and may be formed in zigzags or in a wavy shape having a predetermined radius.

The straight flow path and the curved flow path provided as described above may be formed in an interlocking structure and may be closed when they contact the ground and a load is applied. That is, when the straight flow path and the curved flow path contact the ground, they may be provided to perform a function of discharging internal water to the outside of the tire while being closed.

Also, the cuff unit 1400 may be provided to have a depth of less than 1 mm.

Also, the first cuff unit 1410 and the second cuff unit 1420 are provided to include an image cuff of which a depth is smaller than those of the straight flow path and the curved flow path.

More specifically, the first cuff unit 1410 and the second cuff unit 1420 may further include additional image cuffs in addition to the straight flow path and the curved flow path, and may include the image cuff instead of the straight flow path and the curved flow path.

Figure 10:
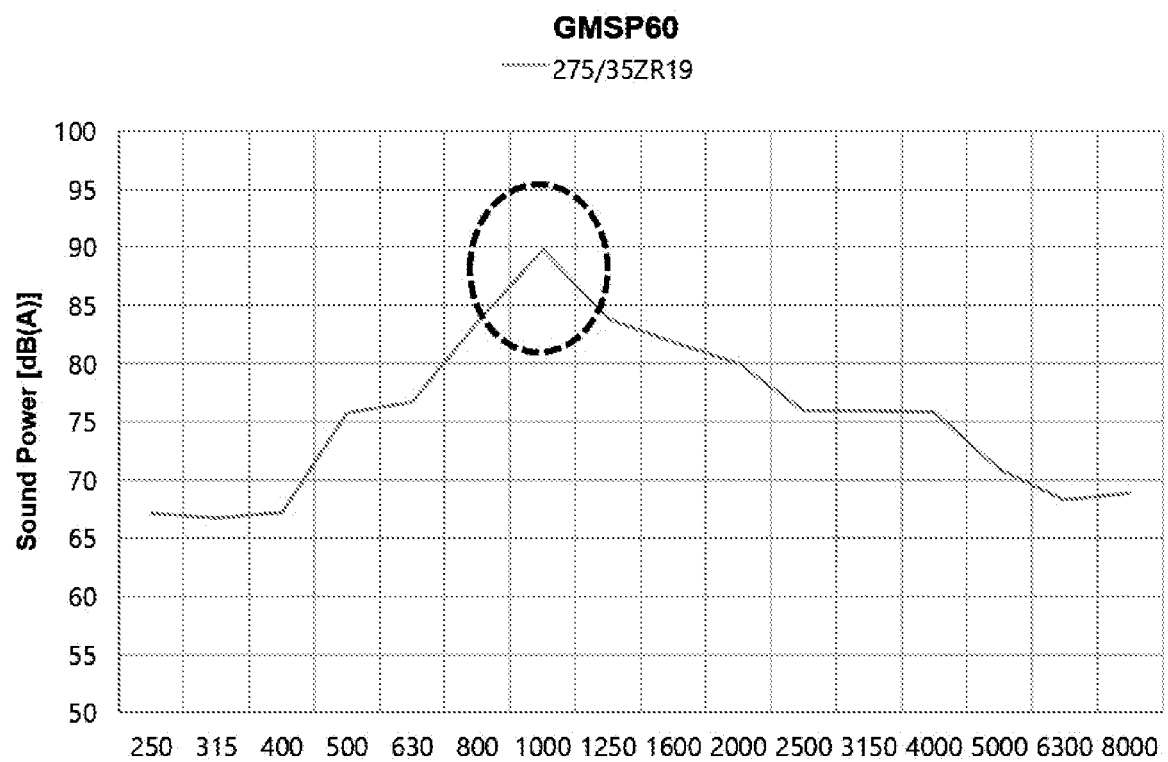
FIG. 10 is a graph showing a magnitude of pipe resonance noise according to a frequency band.

FIG. 10 is a graph showing a magnitude of the pipe resonance noise according to a frequency band.

Referring to FIG. 10, the tire has a tubular shape when the main groove contacts the ground. Due to this tubular shape, noise is generated by the pipe resonance noise. This is related to the size of the tire and a ground field on the ground, and the noise has, as shown in FIG. 10, a band of about 800 to 1200 Hz. This has a great influence on the overall tire rolling noise.

Figure 11:
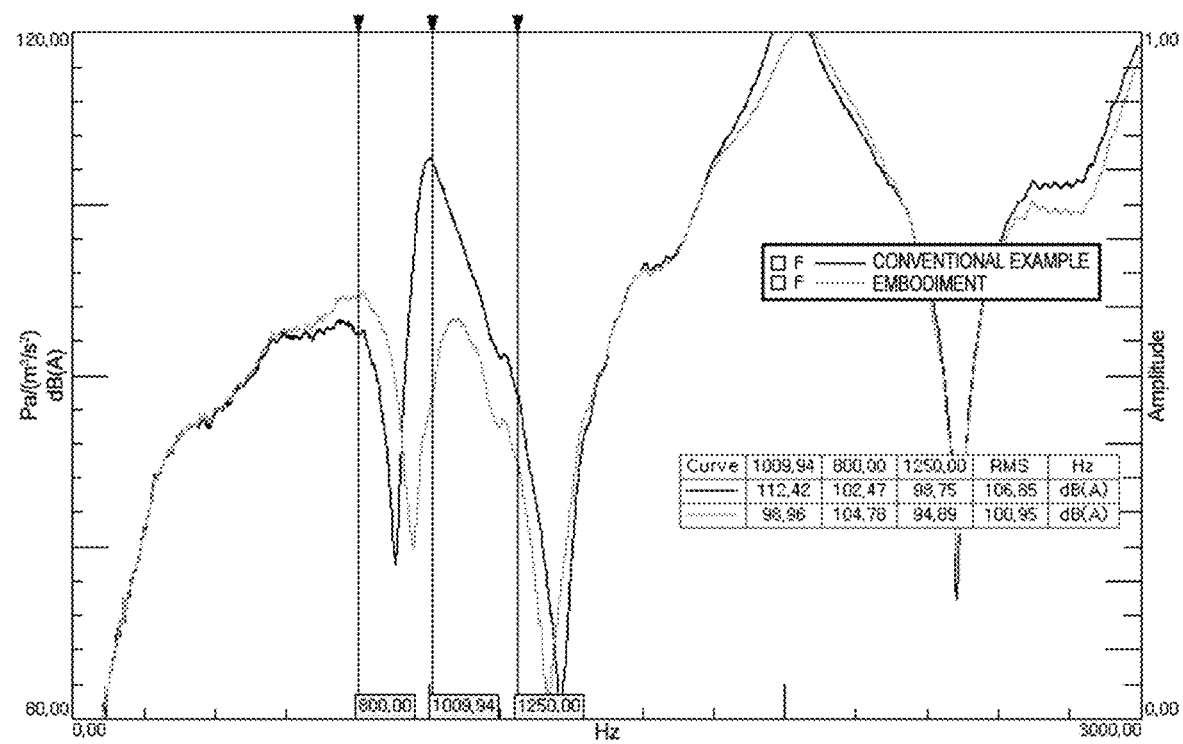
FIG. 11 is a graph showing the pipe resonance noise of a conventional example and the embodiment of the present invention.

FIG. 11 is a graph showing the pipe resonance noise of a conventional example and the embodiment of the present invention.

Referring to FIG. 11, a verification experiment was performed by using a mock-up according to the present invention in order to verify the pipe resonance noise reduction effect according to the present invention.

The mock-up was used in the verification experiment, and a Q-source that is an air volume shaker, and a microphone for noise measurement were used. The frequency response function between the Q-source and the mock-up is measured, and a smooth main groove shape of a general tire and the Helmholtz resonator of the present invention are manufactured as a mock-up and are used for verification of the pipe resonance reduction. FIG. 11 shows the result. The graph of the conventional example shows a simple main groove, and the graph of the embodiment of the present invention shows a signal from the main groove unit 1100 to which the Helmholtz resonator of the present invention is applied. As a result of the verification experiment, as shown in the graph, it can be seen that the peak point of the pipe resonance has been significantly reduced, and it can be found that RMS value in a band of 900 Hz to 1250 Hz which is a pipe resonance noise band has been reduced by about 5.9 dB, that is to say, from 106.85 dB to 100.95 dB.

As described above, according to the embodiment of the present invention, it is possible to reduce the pipe resonance noise generated in the main groove unit 1100.

Also, since the neck 1313 is exposed on the surface of the tire at the end of wear, it can contribute to anti-slip performance due to increase in void.

The above descriptions of the embodiment of the present invention are illustrative only. It can be understood by those skilled in the art that the embodiments can be embodied in other specific forms without departing from its spirit or essential characteristics. Therefore, the foregoing embodiments and advantages are merely exemplary and are not to be construed as limiting the present invention. For example, each component described as a single type may be embodied in a distributed manner, and likewise, components described in a distributed manner may also be embodied in a coupled form.

The scope of the present invention is described by the following claims, and all alternatives, modifications, and variations which are derived from the meaning and scope of the claims and equivalents thereto should be construed as being included in the scope of the present invention.

REFERENCE NUMERALS

| | |
|---|---|
| 1000: tire with a resonator for noise reduction | 1110: first main groove |
| 1100: main groove unit | 1130: third main groove |
| 1120: second main groove | 1200: resonance unit |
| 1140: fourth main groove | 1220: second resonance unit |
| 1210: first resonance unit | 1310: first neck unit |
| 1300: neck unit | 1312: curved flow path |
| 1311: straight flow path | 1320: second neck unit |
| 1313: neck | 1410: first cuff unit |
| 1400: cuff unit | |
| 1420: second cuff unit | |

What is claimed is:

1. A tire having a resonator for noise reduction, the tire comprising:

a plurality of main grooves formed to extend along a circumferential direction of the tire;

a resonance unit formed between a pair of main grooves among the plurality of main grooves;

a neck unit disposed to connect the resonance unit to one of the pair of main grooves; and a kerf unit disposed to connect the resonance unit to the other of the pair of main grooves, wherein the neck unit comprises:

a straight flow path extending between the resonance unit and the one main groove;

an undulating flow path extending from a bottom of the straight flow path; and a cylindrical neck formed under the undulating flow path, wherein the kerf unit consists of:

a straight flow path extending between the resonance unit and the other main groove; and an undulating flow path extending from a bottom of the straight flow path of the kerf unit directly to the resonance unit and the other main groove without having an enlarged portion at a bottom of the undulating flow path, wherein the neck unit is configured to maintain the one main groove and the resonance unit to be in communication with each other through the cylindrical neck when receiving a load, while the kerf unit is configured to be closed when receiving the load as the straight flow path and the undulating flow path thereof are interlocked so as to discharge internal water to an outside of the tire.

2. The tire of claim 1, wherein the resonance unit includes a Helmholtz resonator.

3. The tire of claim 1, wherein the plurality of main grooves include a first main groove, a second main groove, a third main groove, and a fourth main groove, which are formed separately from each other and sequentially from an outside of a vehicle.

4. The tire of claim 3, wherein the resonance unit comprises:

a first resonance unit disposed between the first main groove and the second main groove; and a second resonance unit disposed between the third main groove and the fourth main groove.

5. The tire of claim 4, wherein a volume of each of the first resonance unit and the second resonance unit is in a range of 500 mm$^3$ to 1,500 mm$^3$.

6. The tire of claim 4, wherein the neck unit comprises:

a first neck unit disposed to connect the first resonance unit and the first main groove; and a second neck unit disposed to connect the second resonance unit and the third main groove.

7. The tire of claim 6, wherein a length of the first neck unit is in a range of 5 mm to 20 mm.

8. The tire of claim 4, wherein the resonance unit further comprises a third resonance unit which is disposed between the second main groove and the third main groove.

9. The tire of claim 1, wherein a diameter of the cylindrical neck is in a range of 1 mm to 3 mm and a cross-sectional area of the cylindrical neck is in a range of 1 mm$^2$ to 12 mm$^2$.

* * * * *